United States Patent Office 3,109,827
Patented Nov. 5, 1963

3,109,827
NEW REACTION PRODUCTS OF EPOXIDIZED OILS AND AN ANTIMONY HALIDE
Derick Fysh, Stratford, London, England, assignor to A. Boake, Roberts & Company Limited, London, England
No Drawing. Filed May 6, 1959, Ser. No. 811,253
Claims priority, application Great Britain May 8, 1958
10 Claims. (Cl. 260—22)

The present invention relates to new organic compounds containing antimony in the molecule and useful as intermediates in the production of paints, textile finishes and synthetic resins with special properties.

According to the present invention a process for the production of new compositions of matter comprises reacting antimony trichloride with an epoxide as hereinafter specified.

The epoxide reaction component is a substance produced in known manner by epoxidizing an unsaturated alcohol or an ester of an unsaturated fatty acid, for example, by reaction of the ester with hydrogen peroxide in the presence of formic or acetic acids whereby epoxide groups are formed across double bonds of the unsaturated ester. The unsaturated ester is one having an iodine value which should not be less than about 80 and should not contain any substantial proportion of conjugated double bonds. It is generally assumed that all compounds containing epoxy groups will act in an equivalent manner in reactions concerning the epoxide groups but, while this may be so, the compounds produced and the yields obtained will vary very considerably according to the nature of the unsaturated compound, i.e. whether it is derived from an epoxidized ester of an unsaturated fatty acid and whether the said ester contains conjugated unsaturation and further whether the epoxy compound is derived from an olefine or resinous condensation products of ethylene oxide derivatives with phenols. For the purpose of the present invention therefore the epoxide reaction component is the product obtained by epoxidizing an unsaturated alcohol or ester as above specified and in particular relates to those epoxidized animal and vegetable oils which contain no appreciable conjugated unsaturation.

Epoxidizable compounds particularly representative of those indicated herein are unsaturated glycerides, acids and simple or complex esters derived from vegetable, animal, marine and petroleum sources. Some typical vegetable oils with non-conjugated unsaturation are tall oil, peanut, cottonseed, corn, soya bean, safflower walnut, rapeseed, castor, linseed and perilla. Some typical animal fats are lard and various grades of tallow. Some typical marine oils are menhaden, sardine, cod, pilchard, shark, whale, and sperm oils. Oils and fats from these sources are essentially glycerides, excepting sperm and whale oils which are mixtures of glycerides and ester of mono-hydric long chain alcohols. Tall oil, as isolated, is in the acid form. These oils contain mixtures of esters of saturated and unsaturated fatty acids containing from six to twenty-six carbon atoms per straight chain. The unsaturated acids contain from one to four ethylenic groups. In addition tall oil contains acids with a substituted and partially hydrogenated phenanthrene structure.

For this disclosure, although not limited thereto, glycerol esters serve as a basic source of fatty acids and other esters or products for epoxidation. In the mixture of fatty acids derived from these oils, or the esters themselves, there may be two alternatives: (1) The unsaturated components after separation of saturated compounds; or (2) the mixture can be used without separation of saturated compounds. The latter is usually the preferred method.

Typical unsaturated, non-conjugated fatty acids, having one or more ethylenic groups, are lauroleic, $C_{12}H_{22}O_2$, myristoleic, $C_{14}H_{26}O_2$, palmitoleic, $C_{22}H_{44}O_2$, recinoleic, $C_{18}H_{34}O_3$, linoleic, $C_{18}H_{32}O_2$, linolenic, $C_{18}H_{30}O_2$, arachidonic, $C_{20}H_{32}O_2$, and clupanodic, $C_{22}H_{38}O_2$. The vegetable, animal and marine oils are typical natural mixed glycerides containing these component acids which can be epoxidized individually or in mixed relationship and in substituted or unsubstituted condition, as desired.

Soybean oil is generically typical of a family of unsaturated non-conjugated compounds containing one or more ethylenic groups which can be epoxidized by the herein disclosed mixture of reactants. Soybean oil is representative of the following general types of epoxidizable glycerol esters; trilinoleate, trioleate, mono-oleate monolinoleate monolinolenate, mono-stearate dilinoleate, dilinoleate mono-oleate, dioleate monolinoleate, mono-oleate disterate, and dioleate monostearate.

The mixed fatty acids derived from the natural glycerides may be re-esterified with other polyhydric alcohols such as ethylene glycol, diethylene glycol, mono-, di-, and polypentaerythritol, sorbitol and the like. These epoxidized esters are less or more viscous than the corresponding glycerol esters. Viscosity is related to the functionality of the polyol as compared to glycerol. For some end uses viscosity of this origin is desirable.

As indicated, the natural oils or fatty acids may be converted to various type of esters as by alcoholysis or esterification with aliphatic and aromatic saturated and unsaturated, substituted and unsubstituted, mono- and poly-hydric alcohols. The alcohol radicals may also contain one or more epoxidizable ethylenic groups. However, it should be recognized that generally the process relates to epoxidizing unsaturated compounds having ethylenic groups, within the limits defined, irrespective of the substituent group or groups which may also contain an epoxidizable bond also within the limits defined.

The natural glycerides and the derived fatty acids serve as a base raw material for the preparation of mixtures of unsaturated fatty alcohols and esters.

The products from the natural glycerides are essentially straight chain compounds. Thus, the structure of the long chain radicals found in the unsaturated alcohols and esters are essentially identical with those of the starting materials.

Further valuable epoxidizable compounds as defined, may result in other ways which involve the reaction of fat derived compounds with themselves or products of other sources, e.g., petroleum. Thus, fatty acids, alcohols or esters may be dimerized or polymerized with themselves or co-polymerized with other unsaturated reactive compounds. The latter include styrene, its homologues and derivatives, cyclo pentadiene and its derivatives, mono- and poly- unsaturated straight and branched chain olefine, alpha-beta mono- and di- basic acids including esters, amides, and nitriles. These adducts may be representative of typical copolymer or Diels-Alder adduct compounds.

The products derived from petroleum sources are usually of a branched or cyclic structure. Typical unsaturated compounds useful for epoxidation by the process herein described, are obtained directly from petroleum, or formed during the cracking and reforming operations.

Many other compounds containing ethylenic groups are derived by chemical synthesis, fermentation, and the distillation of oleoresinous mixtures such as gum turpentine.

In the process according to the invention the antimony trichloride reacts by opening up the epoxide group whereby the chlorine attaches itself to one side of the epoxide bridge and the oxygen of the broken epoxide group forms an antimony oxide link with the other side of the bridge.

In carrying out the invention, in order that the reaction may not be too violent, the antimony trichloride is preferably dissolved in a solvent and added slowly to a solution of the epoxide compound, conveniently in a common solvent. A suitable common solvent is chloroform or other chlorinated hydrocarbon.

According to the precise way in which the process according to the invention is carried out the oxirane oxygen of the reaction products may be lower than might be expected but this is due to the formation of by-products which, however, are not detrimental either to the reaction products or to their subsequent reaction with polyesters.

It is well-known that antimony compounds are of special value in preventing or extinguishing the combustion of substances which would otherwise be flammable. (Thus, for example, antimony trioxide is recommended by Parkyn [British Plastics 1959, 32, page 29] as a flame retardant addition to various synthetic resins.) If, however, the antimony compound is merely mixed with the resin, say with a polyester resin, a variety of defects are encountered. Thus, the retardant effect may not be permanent, but may instead be reduced by exposure to climatic influences. It is a valuable feature of the present invention that by employing the antimony-bearing epoxy reaction product as an intermediate in the preparation of certain synthetic resins, a true compound of the antimony with the resin is obtained, so that the antimony, with its flame retardant effects, becomes fully compatible with the resin and permanently bound to it. A special feature of the invention is that antimony may be bound into polyester resins in this way.

These polyester resins are produced according to the invention by heating the antimony trichloride reaction product with an unsaturated polyester whereby polyester resins are produced which contain antimony in the molecule and these resins have the valuable property of non inflammability.

As is well-known the unsaturated polyester resins are produced by condensation of an unsaturated dicarboxylic acid with a dihydroxy alcohol. The original unsaturation of the carboxylic acid remains in the condensation polymer. This unsaturation in the condensation polymer may also be increased by employing both an unsaturated acid and an unsaturated alcohol. The unsaturated polyesters may be cross-linked by compatible unsaturated monomers for which purpose styrene is largely used. Other cross-linking agents include other derivatives of benzene, diallyl phthalate and methyl methacrylate.

The unsaturated dicarboxylic acids used are mainly maleic and fumaric acids and useful mixed esters may be obtained by mixing phthalic acid with the unsaturated acid. Phthalic acid itself does not produce any unsaturation capable of double bond polymerization in the mixed ester but its presence with maleic acid increases the compatibility of the polyesterification product with the aromatic cross-linking monomer and provides additional means of varying degree of cross-linking by varying the proportions of the phthalic and unsaturated acids. The degree of cross-linking may also be controlled by varying the amount of the cross-linking agent.

The alcohols used in polyester manufacture are the glycols. Those mainly employed are the ethylene, propylene, diethylene and dipropylene glycols. The use of an unsaturated glycol permits additional cross-linking and therefore produces a more rigid cured resin. The unsaturated glycols however are not readily available.

The following examples illustrate the nature of the invention and how it may be carried into effect.

*Example 1*

Epoxidized soya bean oil (100 parts, oxirane oxygen content 6.2%) was dissolved in chloroform (380 parts). A solution of antimony trichloride (18.5 parts) in chloroform (150 parts) was added dropwise and the mixture gently warmed. The chloroform was then distilled off. The antimony-bearing product was a tough rubbery gel.

*Example 2*

Epoxidized normal octyl alcohol esters of linseed oil fatty acids (100 parts, oxirane oxygen content 5.2%) were dissolved in chloroform (450 parts). A solution of antimony trichloride (6.5 parts) in chloroform (90 parts) was added dropwise and the mixture gently warmed. The chloroform was then distilled off. The antimony bearing product was a viscous oil, and still contained 2.9% oxirane oxygen.

*Example 3*

A co-polyester of maleic and phthalic acids with propylene glycol was prepared. 65 parts of this were allowed to react at 140° C. for 3½ hours with 20 parts of the material described in Example 2. Styrene was added to the linear polyester thus produced, and castings were prepared by adding cobalt naphthenate and methyl ethyl ketone peroxide. The procedures for preparing the co-polyester, adding the styrene and casting a sample are well-known and were performed in commonly understood ways. The cast specimens were relatively non-inflammable when compared with polyester resins which did not contain antimony.

*Example 4*

Epoxidized normal octyl alcohol esters of linseed oil fatty acids (1,360 parts, oxirane oxygen content 5.0%) were carefully dried, and antimony trichloride (107.5 parts) dissolved in chloroform (400 parts) was added slowly at room temperature. The mixture was stirred for two hours, the chloroform removed under low vacuum, and the product heated to 110° C. under high vacuum. A brown viscous oil was obtained, having an oxirane oxygen content of 0.77%.

*Example 5*

A copolyester of propylene glycol maleate-phthalate was made by heating together propylene glycol (269 parts), phthalic anhydride (250 parts) and maleic anhydried (150 parts) at 180° C. After 2 hours, the condensate described in Example 4 above (60 parts) was added, and reaction was continued until the acid value had fallen to 35 mgms. of potassium hydroxide per gram of material. The linear polyester so produced, when dissolved in styrene and cured by the addition of well-known initiators and accelerators, gave castings which had the valuable property of extinguishing themselves if ignited and removed from the flame.

I claim:

1. A process for the production of new organic fatty compounds with straight chains of six to twenty-six carbon atoms containing antimony in the molecule comprising the steps of mixing antimony trichloride with an epoxidized compound selected from the group consisting of fatty acids, fatty esters, fatty alcohols, and mixtures of the same containing 6 to 26 carbon atoms in the fatty chain and having before epoxidation from 1 to 4 non-conjugated ethylenic groups and after epoxidation contains epoxide groups across the bridges of said ethylenic groups, heating the said mixture effecting a reaction opening up the epoxide group with the chlorine attaching itself to one side of the epoxide bridge and the oxygen of the broken epoxide group forming an antimony oxide link with the other side of the bridge and producing thereby the said new organic compound.

2. The product produced by the process of claim 1.

3. The process of claim 1, wherein the epoxidized fatty compound is epoxidized esters of long chain fatty acids.

4. The process of claim 1, wherein the epoxidized fatty compound is dissolved in a chlorinated hydrocarbon.

5. The process of mixing the antimony product of claim 1 with a polymerizable unsaturated polyester material comprising a polymeric derivative of a polycarboxylic acid material and a polyhydroxy alcohol, heating the mixture and effecting an intermolecular reaction chemically combining the said polyester and said antimony product.

6. The product produced by the process of claim 5.

7. The process of claim 5, wherein the said polyester comprises a maleic-phthalic acid mixed ester.

8. The process of claim 5, wherein the said polyester material comprises a fumaric-phthalic acid mixed ester.

9. The process of mixing the antimony product of claim 5 with a compatible cross-linking unsaturated monomer containing a polymerizable ethylenic group, adding an accelerator and effecting co-polymerization of the said antimony product and said monomer.

10. The product produced by the process of claim 9.

References Cited in the file of this patent

UNITED STATES PATENTS

| | | |
|---|---|---|
| 2,488,975 | Hunter | Nov. 22, 1949 |
| 2,528,934 | Wiles | Nov. 7, 1950 |
| 2,895,929 | Yusem | July 21, 1959 |
| 2,895,930 | Yusem | July 21, 1959 |

FOREIGN PATENTS

| | | |
|---|---|---|
| 792,702 | Great Britain | Apr. 2, 1958 |

OTHER REFERENCES

Ballum et al.: Chem. Abstracts, vol. 52, No. 2, Jan. 25, 1958, page 1057e.